Aug. 25, 1936.                      A. HERZ                      2,051,945
         MEANS FOR MITIGATING INDUCED IMPACT VOLTAGES AND THE LIKE
                 Filed Oct. 8, 1931           3 Sheets-Sheet 1

Inventor:
Alfred Herz
By Brown, Jackson, Boettcher & Dienner
Attys.

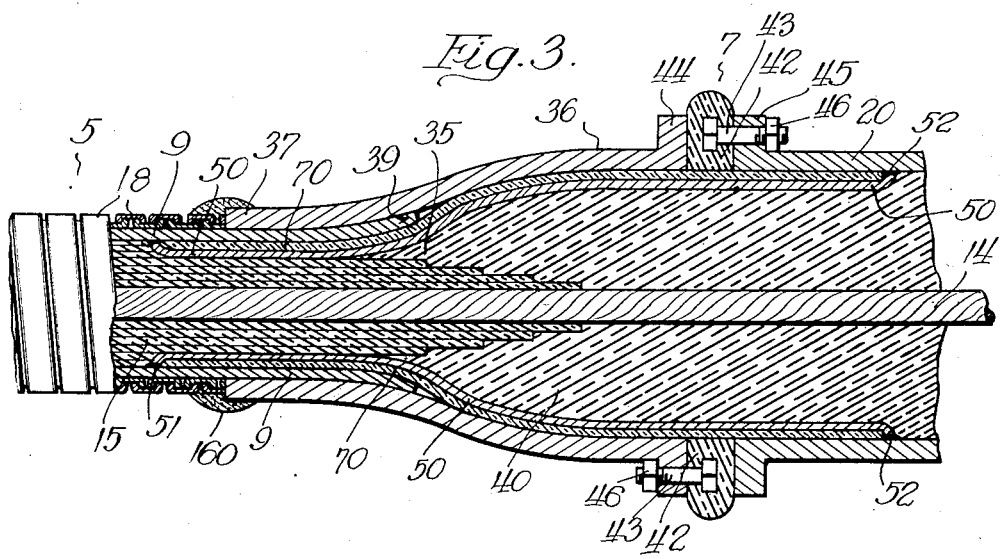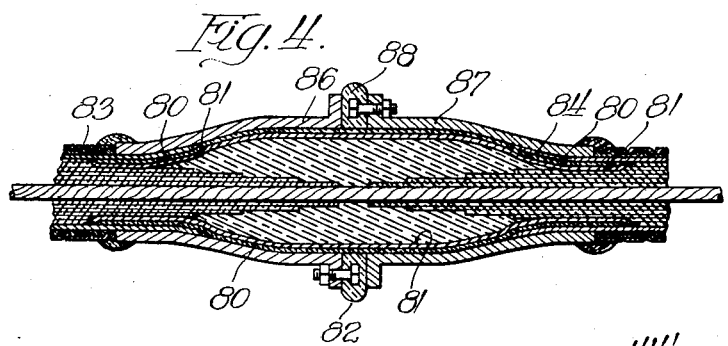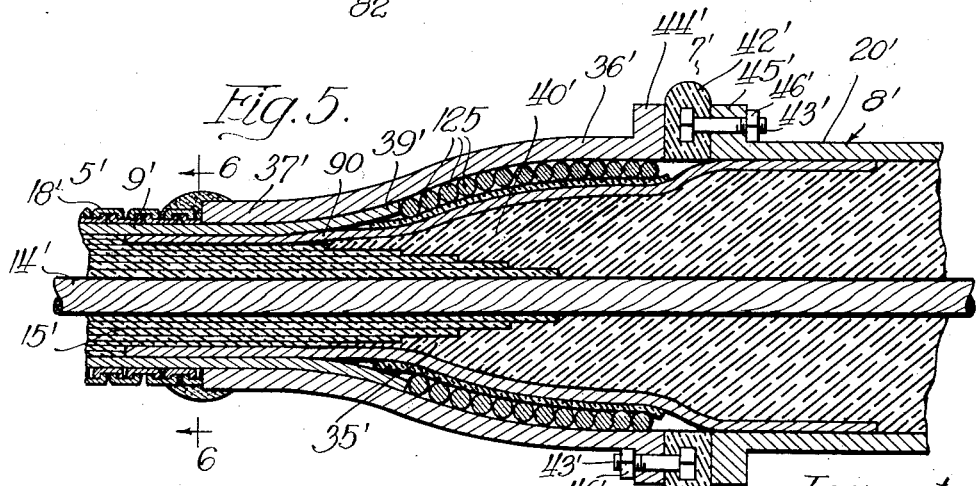

Aug. 25, 1936.   A. HERZ   2,051,945
MEANS FOR MITIGATING INDUCED IMPACT VOLTAGES AND THE LIKE
Filed Oct. 8, 1931   3 Sheets-Sheet 3
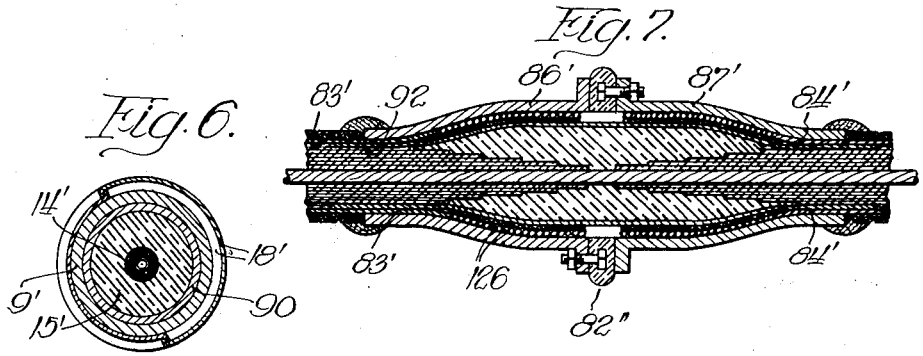
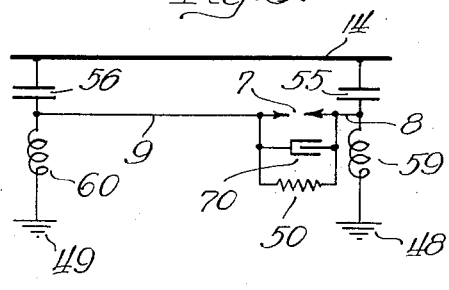
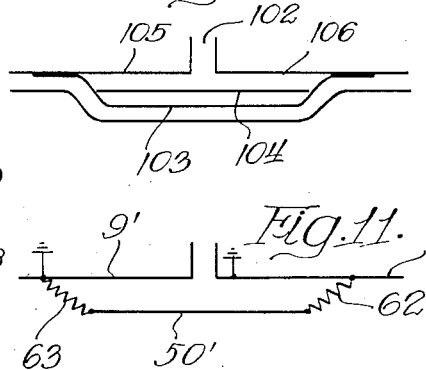
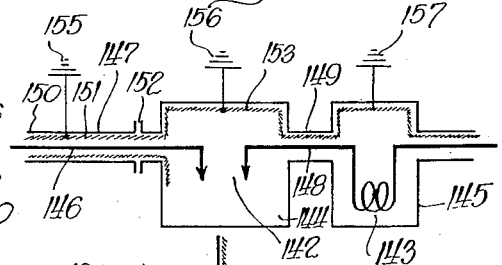
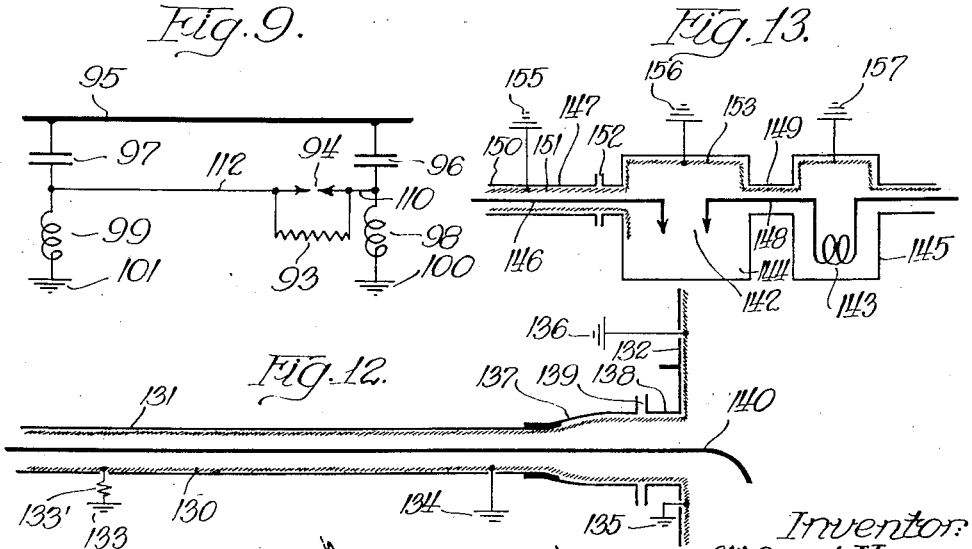

Patented Aug. 25, 1936

2,051,945

UNITED STATES PATENT OFFICE 2,051,945

MEANS FOR MITIGATING INDUCED IMPACT VOLTAGES AND THE LIKE

Alfred Herz, Chicago, Ill.

Application October 8, 1931, Serial No. 567,552

9 Claims. (Cl. 175—294)

My invention relates to means for mitigating induced impact voltages and the like.

While I have illustrated and described the invention in connection with several particular embodiments, it is to be understood that the invention is not limited to these particular embodiments but may be employed in any similar or equivalent apparatus, or between any similar or equivalent parts.

One of the chief features heretofore stressed in connection with high voltage armor-clad switch gear has been the elimination of hazard to life and apparatus by complete enclosure of live parts. Apparatus of this sort ordinarily is composed of potential transformers, current transformers, oil switches, and enclosed oil immersed disconnects all interconnected by oil filled cables or other connections. Cables of this sort usually are carried on open racks and are lead sheathed and furthermore protected by heavy copper armor tape. To eliminate heating due to induced currents in the sheath, armor and supporting structures, the lead and copper sheaths are interrupted electrically by insulating joints, and the casing or framework of the apparatus is insulated from the adjacent end of the cable sheath by a similar joint. Short sections of cable usually have sheath insulators at one end only, and the armor usually is grounded solidly at the middle of each of the more lengthy sections of cable.

I have found that during switching operations of apparatus of this sort trouble is had with induced impact voltages making their appearance on various parts of the casings or framework of the apparatus. The cause of these high induced voltage effects originates from breaking charging voltage and charging current to parts that are so well insulated that the dissipation for short time intervals is practically zero. My present understanding is that when the contacts of a disconnect unit of apparatus of this sort separate, current continues to flow until a current zero is reached. The arc then goes out momentarily, although the electrostatic charge on the isolated parts is a maximum, charging current being at substantially zero power factor leading. At the moment of current zero there is no potential difference between separated contacts, but as the cycle progresses a potential difference builds up across the separating contacts until a point is reached where the space breaks down. The previously isolated parts are then abruptly charged to the new supply potential, and this process repeats until the contacts are so far apart that the space no longer breaks down. At each sudden charge of the isolated parts a displacement current flows through the cable dielectric to the sheath, and thence to ground by the grounding system. The potential application giving rise to these currents is practically instantaneous, thereby producing a current with a very steep front. To such a current the ground wires have considerable impedance.

I find that during switching operations of apparatus such as that referred to above, sparks will jump across the cable sheath insulators and that when the disconnects, which are slow in action compared to an oil switch, are operated, the spark is prolonged into a continuous stream which lasts usually as long as the arcing continues between disconnect contacts. This arcing damages the sheath insulators by grooving the same in the passage of the arc across the insulators, and in addition to this hazard to insulation there is the possibility of shock to men working on the structure which may cause them to fall from the structure with the possibility of more or less serious injury. The effect, therefore, is such as to nullify practically one of the chief features heretofore urged in connection with apparatus of this sort.

The object of my present invention is to mitigate these induced impact voltages in the operation of apparatus of this sort, and thereby to reduce the hazards to person and equipment and provide a greater degree of safety in the operation of such apparatus.

I accomplish this by using low resistance, low impedance means in bridging relation across the places where these high voltage phenomena make their appearance. In the preferred embodiment of the invention this low resistance, low impedance means is in the form of a conductive wrapping over the insulation which ordinarily envelopes the conducting core of the cable, or it may take the form of a casing; however, in the preferred embodiment this conductive wrapping may in itself have the desired resistance value, or may be bonded to the parts to be brought to the same voltage by suitable resistors. This conductive wrapping is in turn overlaid with an additional insulating medium of limited value. This conductive wrapping will thus form a condenser plate tending to put voltage of equal polarity on the parts it is to protect and in addition acts as a resistance bond. The low resistance, low impedance means helps to balance the parts electrically, and in addition furnishes a path for the condenser to unload itself so that there is no perceptible kick back from the condenser. I contemplate within the scope of this invention to use the low resistance, low impedance means alone or in conjunction with the condenser bridged by this means, and the appended claims are intended to cover both of these forms of the invention.

Now, in order to acquaint those skilled in the art with the manner of constructing and operating the present invention, I shall describe several embodiments of the invention, in connection with the accompanying drawings, in which:

Figure 3 is an enlarged view in vertical section through the adjacent ends of the cable and casing or framework of the apparatus and the insulating joint therebetween;

Figure 4 is a fragmentary vertical section showing the invention applied across the insulating joint between two adjacent sections of a cable sheath;

Figure 5 is a view similar to Figure 3, showing the invention as applied without the condenser forming insulating medium bridging the joint and overlaying the conductive wrapping;

Figure 6 is a cross sectional view taken on the line 6—6 of Figure 5;

Figure 7 is a view similar to Figure 4, showing this embodiment of the invention without the condenser forming insulation medium bridging the joint and overlaying the conductive wrapping;

Figure 8 is a circuit diagram of the embodiment of the invention shown in Figures 1 to 3, inclusive;

Figure 9 is a circuit diagram of the embodiment shown in Figure 5;

Figure 10 is a fragmentary diagram showing the low resistance, low impedance means in bridging relation between the members, the voltage of which it is intended to equalize, and the condenser forming insulating wrapping interposed between these members and the resistance means and bridged thereby;

Figure 11 is a fragmentary diagram showing a conductive wrapping bridging the joint between the members and having resistance bonds to the respective parts;

Figure 12 is a schematic view of a further embodiment of the invention; and

Figure 13 is a schematic view of a still further embodiment.

Figure 1:
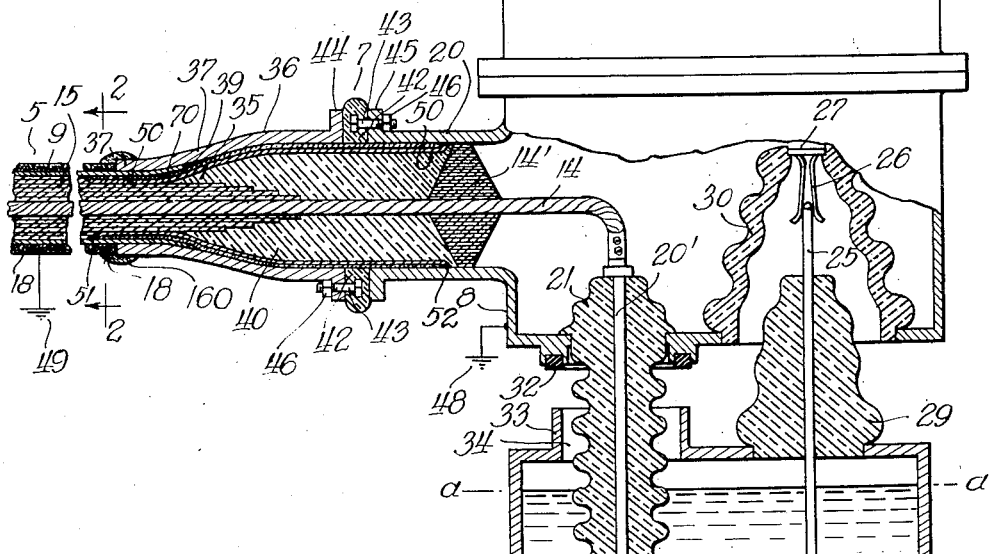
Figure 1 is a more or less schematic view showing an embodiment of the invention in vertical section with the more or less schematically illustrated portion of the metal-clad switch gear partly in elevation.

Referring now to Figure 1, the cable is indicated at 5, and a switching unit is indicated at 6.

The showing of the apparatus 6 while more or less diagrammatic and with parts omitted, and the showing of other parts and their connections simplified for clarity and brevity of disclosure, is illustrative of a portion, at least, of a 132 KV armor-clad switch gear. It is to be understood that this apparatus may include potential transformers, current transformers, oil switches, and oil immersed disconnects all interconnected by oil filled cables or other connecting means, or it may consist of any similar apparatus or portion of such apparatus. These features are well known in the art and I have not illustrated the same in detail nor claimed the same as my invention.

In order to eliminate heating due to induced currents in the sheath, armor, casing and supporting structures, an insulating joint 7 is provided between the casing and other metallic structure 8 of the apparatus 6 and the adjacent end of the sheath 9 of the cable 5 for the purpose of interrupting electrically the joint between the casing or framework of the apparatus and the adjacent end of the sheath.

The cable shown consists of a conducting core 14, which may be composed of copper or other stranded conductor which may be hollow for the circulation of oil therethrough. Where the conductor 14 is hollow, it may be formed upon a helically wound metallic strip formed with the turns of the helix spaced for the seepage of oil outwardly from the conducting core. This, of course, is descriptive of one particular form of cable and may vary. The core 14 is contained in the usual insulating envelope 15, which may be of paper or any other suitable or preferred insulating material, and the hole is enclosed in the metal sheath 9, ordinarily of lead. The insulation 15 is the usual factory insulation and may be stepped at the inner end as shown. In the illustrated embodiment the sheath 9 has an enclosing or surrounding copper armor formed of a copper strip wound helically about the sheath 9, usually with the turns or convolutions of this helix overlapping and interlocking, as shown.

The conductor 14 of the cable enters the inlet 20, of the casing 8, of the apparatus 6, and has direct or suitable bus bar connection with a conductor 20' which passes through an insulating bushing 21 and is in turn connected with a metal contact 22. A stop joint is provided at 14' to prevent the oil from running out of the cable. The contact 22 is in turn adapted for cooperation with a contact 23 at one end of a switch bar 24, for making and breaking circuit connection with a potential transformer or other device. The opposite end of the bar 24 carries a contact 25, which extends upwardly beyond the contact 23 and is cooperable with a contact 26, to which a copper bus bar or other conductor is connected at 27. The contacts 22 and 23 and bar 24 are disposed within a tank or container 28 filled with oil or other suitable insulating liquid substantially to the line $a$—$a$ (Fig. 1) so that the make and break between contacts 22 and 23 occur under oil. The bar 24 and contacts 23 and 25 move bodily with the tank or container 28, which is lowered from the upper casing or structure part 8 to separate contacts 23 and 25 from the contacts 22 and 26. The conductive connection between the switch bar 24 and contact 25 passes through an insulating bushing 29, carried at its lower end on container 28, and contact 26 is carried by an insulating bushing 30 telescoping over the upper end of bushing 29, and carried by the structure 8.

The length of sliding engagement of contact 25 with contact 26 is greater than the length of the sliding engagement of contact 23 with contact 22 so that the contact 23 will break or separate from contact 22 under oil before the contact 25 breaks or separates from contact 26. The separation of contact 25 from contact 26 occurs in air within the casing or structure 8. The casing or metal structure 8 has an annular recess around the bushing 21, and yieldable gasket 32 is secured in this recess and engages, when the container 28 is in its uppermost position, an annular lip or flange 33 around the opening 34 through which bushing 21 extends to provide a fluid-tight closure.

The end of the cable 5, adjacent the structure or apparatus 6, has the lead sheath 9 and the surrounding copper armor 18 removed therefrom, as indicated at 35 in Figures 1 and 3. A metal sleeve or bell 36 has a reduced end 37, which fits snugly over the end of the sheath 9 and may be secured thereto by a wiped joint 160 or otherwise as desired. The inner end of the sheath 9 is belled out at 39 into cooperation with flaring portion of the sleeve 36, and insulating tape indicated at 40 is wound around the insulation 15 and conductor 14 inwardly of the sheath 9 to build up a satisfactory body of insulating material and to swell out the insulation to effect a graduated recession of the sheath metal. Metallic anti-corona tape may be wound upon the insulation 40, extending into contact with the sheath 9 at one end and terminating at its opposite end at or short of the outer side of the insulating ring 42. Under conditions the conductive wrapping will in itself fulfill the function of the anti-corona tape. The insulation ring 42 insulates the casing or metal structure 8 from the sleeve 36 and thereby from the sheath 9, and at the same time joins the sleeve to the casing 8. For the latter purpose the ring 42 has screws 43 provided with headed ends molded or embedded therein, and the shanks of these screws extend alternately in opposite directions through apertures in flanges 44 and 45 of sleeve 36 and casing part 8, and have threaded engagement with nuts 46.

A ground connection for the casing or framework structure 8 is indicated at 48, and a ground connection for the sheath 9 is indicated at 49. Referring to the diagram of Figure 8, it will be noted that the distance from the ground connection 48 to the interruption or joint 7 between the sheath 9 and the casing or other part 8, is materially less than the distance from the interruption or joint 7 to the ground connection 49. As illustrative of a particular embodiment of the invention, the distance from the interruption or joint 7 to the ground connection 49 is approximately 35 feet, whereas the length of circuit around the ground connections 48 and 49 through earth and all is approximately 80 feet. This causes the tendency toward potential differences between the parts 8 and 9.

Figure 2:
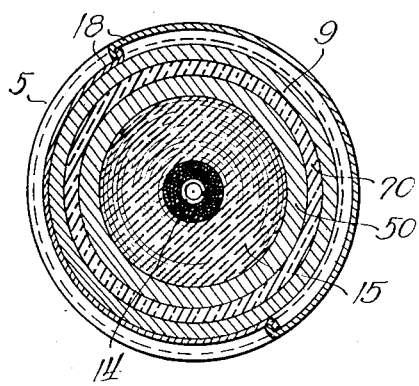
Figure 2 is an enlarged cross sectional view taken on the line 2—2 of Figure 1.

In the embodiment of Figures 1 to 3, inclusive, the conductive wrapping 50 is applied over the insulation 40. This wrapping 50 may be a relatively low resistance conductor such as, for example, a flat michrome wire wound helically upon the insulation 15 as shown, and it provides a relatively low resistance bond of considerable area between the parts 8 and 9, this bond being relatively short as indicated in Figure 8, so that the impedance will be relatively low, or any of the semi-conductors such as asbestos or fabric coated with graphite or metallic particles or the like might be used. The wrapping 50 is joined electrically at its opposite ends to the members 8 and 9, the voltage of which it is intended to equalize, one end of the wrapping being joined electrically at 51 to the sheath 18, and its opposite end being joined electrically at 52 to the casing or other metal structure 8. This relatively short wrapping forms a low impedance bond of such resistance as to control the flow of induced current due to energy flow over the conductor proper, and has considerable area in bridging relation across the joint 7 where high voltage phenomena make appearance, this low resistance bond tying the casing or metal structure on one side of the joint to the sheath 9 on the opposite side of the joint.

This wrapping 50 may in itself have the desired resistance value, or as indicated in Figure 11, the conductive wrapping 50' may be of metal foil or the like, not having the desired resistance value but bonded at its opposite ends by resistance bonds 62 and 63 to the parts 8' and 9'. The conductive wrapping or resistance ribbon 50 of Figures 1, 2, 3 and 8 tends to equalize the voltage of the members 8 and 9, particularly the induced impact voltages which make their appearance on these parts. As illustrative of a practical embodiment of the invention, I find that a resistance of 1 ohm in this connection was suitable with the cable of a 132 KV armor-clad switch gear, but, of course, this may vary. The relatively great impedance values of the usual paths to grounds indicated at 48 and 49 in Figure 1, are indicated at 59 and 60 in Figure 8, and the capacity effects through the insulation to the sheath sections or other parts are indicated at 55 and 56 in this figure.

In Figures 1, 2 and 3 the conductive wrapping 50 is overlaid with an additional insulating medium of limited value indicated at 70. The wrapping 50 will thus form a condenser plate tending to put voltage of equal polarity on the parts it is to protect, and in addition acts as a resistance bond between the parts. It may be found desirable (and from applicant's experience with the 132 KV armor-clad switch gear, it is believed it is) to carry the wrapping 50 on for a considerable distance through the cables and other parts and to ground this wrapping independently of the armor. The resistance, which in itself corrects and reduces the voltage to within reasonable amounts, is augmented by the condenser, and the resistance is not alone in helping to balance the parts electrically but also furnishes a path for the condenser to unload itself so that there is no perceptible kick back from the condenser.

As illustrative again of a practical embodiment of the invention, I find that if the sheath insulators are shunted by a condenser of 10 mfd. or more capacity in parallel with a resistor of about 1 ohm, the voltage across the insulator at times of switch operations will be limited to a value which will not seriously shock a person who happened to be bridging the insulator, and at the same time the grooving of the insulators and thereby the hazard to equipment is eliminated.

The embodiment of Figure 4 is similar to the embodiment of Figure 3, except that the condenser forming insulating medium 80 of limited value bridged by the resistance 81 is applied across the insulating joint 82, between adjacent ends of cable sheath sections 83 and 84, which are interrupted at 85 and provided with metallic sleeves 86 and 87 similar to the sleeve 36 of the previous embodiment. These sleeves are insulated from each other at their adjacent ends and joined together by the insulating ring 88 and this and the remaining construction is similar to the previous embodiment, except that the structure on the sleeve side of the previous embodiment is repeated on the opposite side of the joint.

The embodiment of Figure 5 is similar to the embodiment of Figure 3, except that the low resistance, low impedance conductive wrapping 90 is employed alone in bridging relation between the parts 8' and 9'. In this case metallic anti-corona tape 125 is shown wound upon the insulation 40', with an intervening layer of insulation interposed therebetween, the tape 125 extending into contact with the sheath 9' at one end and terminating at its opposite end at or short of the insulating ring 42'. As before, the conductive wrapping may fulfill the function of the anti-corona tape and this tape may be omitted. The remaining construction of the embodiment is similar to the construction of the embodiment of Figure 3, and corresponding parts are indicated by primed reference characters corresponding with the reference characters of Figure 3. I find that if the resistance element 90 is made up and connected as in the embodiment of Figures 1 to 3, inclusive, that it may be employed alone and that when so employed it will correct and reduce the voltage to within reasonable amounts. The appended claims, therefore, are intended to cover the resistance element alone in bridging relation between the members the voltage of which it is intended to equalize, as well as the resistance element in combination with the bridged condenser as previously described.

In the embodiment of Figure 7 layers of insulation are interposed between the resistance conductor wrapping 92 and the anti-corona shield 126, but there is no condenser forming insulating layer in full bridging relation across the joint. The conductor resistance means is shown arranged in bridging relation across the adjacent ends of sections of an interrupted sheath, the internal space shown being filled with oil in the case of an oil filled cable. Otherwise, except for the wrapping 126 of anti-corona tape, this embodiment is the same as Figure 4 and primed reference characters corresponding with the reference characters of Figure 4 have been applied to corresponding parts.

In the circuit diagram of Figure 9 the relatively low resistance, low impedance means 93 is shown applied alone in bridging relation across the joint 94, between the parts 110 and 112, which may be adjacent sheath sections as illustrated in Figure 7, or one may be the cable sheath and the other the casing or framework of the apparatus or other part. In this diagram the cable conductor is indicated at 95, whereas the capacity effects through the insulation to the sheath sections or other parts are indicated at 96 and 97. The relatively great impedance values of the usual ground paths are indicated at 98 and 99, and the ground connections for the respective members are indicated at 100 and 101, respectively.

In the fragmentary diagram of Figure 10, the bridging resistance across the joint 102 is indicated at 103, and the condenser forming cambric or wrapping of insulating medium overlaying the bridging resistance 103 and bridged by the bridging resistance 103 is indicated at 104. The parts 105 and 106 indicate adjacent sections of an interrupted cable sheath, or one may be the cable sheath and the other the casing or framework of the switching apparatus, or these parts may be any members the voltage of which it is intended to equalize.

In the embodiment of Figure 12, I have shown the conductive wrapping 130 carried on for a relatively considerable distance through the cable sheath 131 and mechanical casing parts 132, for the connected apparatus, and grounded at 133, 134, 135 and 136 independent of the cable sheath casing or other parts, it being understood that such ground connections may be provided with restraining resistances, appropriate to eliminate current flow, such a resistance being indicated at 133' in Figure 12. In this case the sheath sleeve or bell is indicated at 137, the adjacent portion of the metallic casing part is indicated at 138, and the insulating joint between these parts is indicated at 139. The cable core or other conductor is indicated at 140. The usual factory insulation about the conductor and the insulation usually applied on the job at the insulating joint and around the conductor and adjacent end of the factory insulation have not been shown, but it is to be understood that these may be in the form shown in the other embodiments or otherwise as desired. In this case as in the other cases, the induced voltages assumed by the different parts are equalized by bridging the parts by the conductor means 130 of such resistance as to control the flow of current which is induced due to load currents, and at the same time the parts are caused to assume similar voltages when subjected to cause tending to produce unequal voltages. The conductor means 130 preferably is in the form of a wrapping surrounding the conductor 140, thereby producing an electric casing of such impedance as to mitigate flow produced by energy and at the same time the different parts are maintained at approximately the same potential.

In the embodiment of Figure 13, the switching assembly is shown schematically at 142, and a connected transformer is illustrated at 143. The mechanical casing means for the switching assembly 142 and transformer 143 are indicated at 144 and 145, respectively, the conductor 146 constituting the conducting core of the cable 147, whereas the conductor 148, between the switching assembly 142 and the transformer 143, is not a cable but a bus bar or other conductor connection enclosed within the mechanical casing or conduit part 149.

The sheath for the cable 147 is indicated at 150, and the conductive wrapping 151, which again is of such resistance as to control the flow of current induced due to load currents and at the same time causes the parts to assume similar voltages, bridges the insulating joint 152 and extends on as a similar conductor 153 through the mechanical casing parts 144, 148 and 145. The conductive portion 151 is shown in the form of a wrapping forming an electrical casing, whereas the conductive portion 153 extends on through the mechanical casing parts as shown. This may vary. The resistance conductors 151 and 153 are grounded at 155, 156 and 157 preferably independently of the cable sheath and armor, and independently of the metallic or mechanical casing parts.

I do not intend to be limited to the particular details nor to the particular manner of application shown and described.

I claim:

1. In combination, a cable having a conducting core, metallic parts in inductive relation to said core, an insulating joint between said parts, an insulating medium overlying said core, and a resistance conductor overlying said insulating medium, said resistance conductor bridging said joint and connected to said parts on opposite sides of said joint.

2. In combination, a cable having a conducting core, metallic parts in inductive relation to said core, an insulating joint between said parts, an insulating medium overlying said core, a resistance conductor overlying said insulating medium, and an insulating medium overlying the resistance conductor, said resistance conductor and said last insulating medium bridging the joint and connected to the parts on opposite sides of said joint.

3. In combination, a cable comprising a conducting core, a surrounding body of insulating material, a metallic sheath, an insulating joint for said sheath, and a resistance conductor of relatively low resistance value disposed within the sheath and overlying said surrounding body of insulating material, said resistance conductor being connected to said sheath and adapted to bridge said joint.

4. In combination, a cable comprising a conducting core, a surrounding body of insulating material, a metallic sheath, an insulating joint for said sheath, a resistance conductor disposed within the sheath and overlying said surrounding body of insulating material, and an insulating medium overlying said resistance conductor, said insulating medium and resistance conductor being connected to said sheath and bridging said joint.

5. In combination, an armor-clad switch gear having a metal structure, a cable having a conducting core connected to said switch gear, said cable having a metallic sheath, an insulating joint between said sheath and the metal structure of said switch gear or a metallic conductive extension thereof, and resistance conductor means of relatively low impedance value bridging said joint and connected to said sheath and to said metal structure on opposite sides of said joint.

6. In combination, an armor-clad switch gear having a metal structure, a cable having a conducting core connected to said switch gear, said cable having a metallic sheath, an insulating joint between said sheath and the metal structure of said switch gear, and resistance conductor means bridging said joint and connected to said sheath and to said metal structure on opposite sides of said joint, said resistance conductor being of relatively low resistance and relatively low impedance.

7. In combination, an armor-clad switch gear having a metal structure, a cable having a conducting core connected to said switch gear, said cable having a metallic sheath, an insulating joint between said sheath and the metal structure of said switch gear, resistance conductor means of relatively low resistance value bridging said joint and connected to said sheath and to said metal structure on opposite sides of said joint, and a condenser bridging said joint in parallel with said resistance conductor means.

8. In combination, an armor-clad switch gear having a metal structure, a cable having a conducting core connected to said switch gear, said cable having a metallic sheath, an insulating joint between said sheath and the metal structure of said switch gear, resistance conductor means bridging said joint and connected to said sheath and to said metal structure on opposite sides of said joint, a condenser bridging said joint in parallel with said resistance conductor means, said resistance conductor means being of relatively low resistance and relatively low impedance, and said condenser forming means including an insulating medium overlying the resistance conductor means and interposed between it and the metallic sheath.

9. In combination, a sectionalized metallic structure, insulating means between the sections of said structure, a conductor for the flow of load currents, said conductor being arranged adjacent said metallic structure and inducing a flow of current in said structure by load currents in said conductor, means bridging the insulating means between the metallic sections of the structure for limiting independently of the voltage thereon the potential drop across said sections under induced impact voltages due to sudden changes in load current in said conductor, said means comprising a condenser and resistance bridging the insulating means between the metallic sections and electrically connected to said sections on opposite sides of said insulating means, and ground paths of relatively great impedance connected to the sections of said structure on opposite sides of said insulating means.

ALFRED HERZ.